United States Patent
Han et al.

(10) Patent No.: US 9,252,460 B2
(45) Date of Patent: Feb. 2, 2016

(54) SECONDARY BATTERY

(75) Inventors: Jung-Yup Han, Yongin-si (KR);
No-Hyun Kwag, Yongin-si (KR);
Whan-Seok Doh, Yongin-si (KR);
Jae-Soon Kim, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 899 days.

(21) Appl. No.: 12/904,056

(22) Filed: Oct. 13, 2010

(65) Prior Publication Data
US 2011/0140666 A1    Jun. 16, 2011

(30) Foreign Application Priority Data
Dec. 15, 2009    (KR) .................. 10-2009-0125028

(51) Int. Cl.
H02J 7/00       (2006.01)
H01M 10/0587    (2010.01)
H01M 2/04       (2006.01)

(52) U.S. Cl.
CPC ........ *H01M 10/0587* (2013.01); *H01M 2/0443* (2013.01)

(58) Field of Classification Search
CPC .................................. H02J 7/00; H01M 10/46
USPC ............................. 320/107, 112, 128; 429/170
See application file for complete search history.

(56) References Cited

U.S. PATENT DOCUMENTS

| | | | | |
|---|---|---|---|---|
| 4,556,782 A | * | 12/1985 | Fujishima et al. | 392/384 |
| 6,091,224 A | * | 7/2000 | Morita | 320/113 |
| 6,091,227 A | | 7/2000 | Beard | |
| 2008/0012527 A1 | * | 1/2008 | Zick et al. | 320/112 |
| 2009/0039833 A1 | | 2/2009 | Kitagawa | |

FOREIGN PATENT DOCUMENTS

| | | |
|---|---|---|
| JP | 11-016606 | 1/1999 |
| KR | 20-0199271 | 7/2000 |
| KR | 10-2007-0105220 | 10/2007 |
| KR | 10-2007-0109017 | 11/2007 |

OTHER PUBLICATIONS

Office Action dated Sep. 20, 2011 in priority Korean Patent Application No. 10-2009-0125028.
Office Action dated Jan. 21, 2014 in Chinese Patent Application No. 201010576051.0, which claims priority to Korean Application 10-2009-0125028.

* cited by examiner

*Primary Examiner* — Edward Tso
*Assistant Examiner* — Aaron Piggush
(74) *Attorney, Agent, or Firm* — Knobbe Martens Olson & Bear LLP

(57) ABSTRACT

A secondary battery has charging and discharging functions. The second battery prevents an external connection portion from being separated from a connection terminal due to external shocks.

18 Claims, 8 Drawing Sheets

SECONDARY BATTERY

CROSS-REFERENCE TO RELATED APPLICATIONS

This application claims the benefit of Korean Patent Application No. 10-2009-0125028, filed Dec. 15, 2009 in the Korean Intellectual Property Office, the disclosure of which is incorporated herein by reference.

BACKGROUND

1. Field

One or more embodiments of the present invention relate to a secondary battery.

2. Description of the Related Technology

A secondary battery is a chargeable battery. The secondary battery is used in electric driving apparatuses, such as in electric bicycles, electric scooters and electric vehicles. The secondary battery is also used in the portable electronics field, such as in cellular phones, notebooks and camcorders. The secondary battery has a structure in which an electrode assembly having a cathode, an anode and a separator that are wound to form a jelly roll. The wound electrode assembly is installed in a case, through an opening on the case and then the opening is covered by a cap plate. A current collector is installed at an end of the electrode assembly so as to be electrically connected to an electrode terminal included in the cap plate. Thus, when an external terminal is connected to the electrode terminal of the cap plate, a current generated by the electrode assembly is supplied to the external terminal through the current collector and the cap plate.

SUMMARY OF CERTAIN INVENTIVE ASPECTS

One or more embodiments of the present invention include a secondary battery having charging and discharging functions and prevents an external connection portion from being unexpectedly separated from a connection terminal.

According to one or more embodiments of the present invention, a secondary battery includes an electrode assembly in which a separator is interposed between a cathode and an anode and the cathode, the separator and the anode are wound; a case for accommodating the electrode assembly in the case; and a connection terminal connected to the electrode terminal and electrically connected to an external connection portion, wherein the case includes an accommodation groove that is a portion of a surface of the case that is recessed and accommodates the external connection portion.

According to an aspect of the invention, when the connection terminal may be connected to an external load, the connection terminal may perform a discharging function, and when the connection terminal may be connected to an external power source, the connection terminal may perform a charging function.

According to an aspect of the invention, the accommodation groove may accommodate the external connection portion when the external connection portion is connected to the connection terminal.

According to an aspect of the invention, the connection terminal may be disposed in the accommodation groove towards a longitudinal direction of the case.

According to an aspect of the invention, the external connection portion may include a cable and a plug that is disposed at an end of the cable and that is connected to the connection terminal, and the case may include a cable fixing unit for fixing the cable to a portion of the surface of the case.

According to an aspect of the invention, the cable fixing unit may include an extension unit protruding from a portion of the surface of the case, and a fixation groove formed in the extension unit so as to accommodate the cable.

According to an aspect of the invention, the cable fixing unit may be a portion of the surface of the case that is recessed so as to accommodate the cable.

According to an aspect of the invention, the connection terminal may include a supporting unit fixed to the accommodation groove, and a connection unit that is hinged on the supporting unit and that is connected to the external connection portion.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF CERTAIN INVENTIVE EMBODIMENTS

Figure 1:
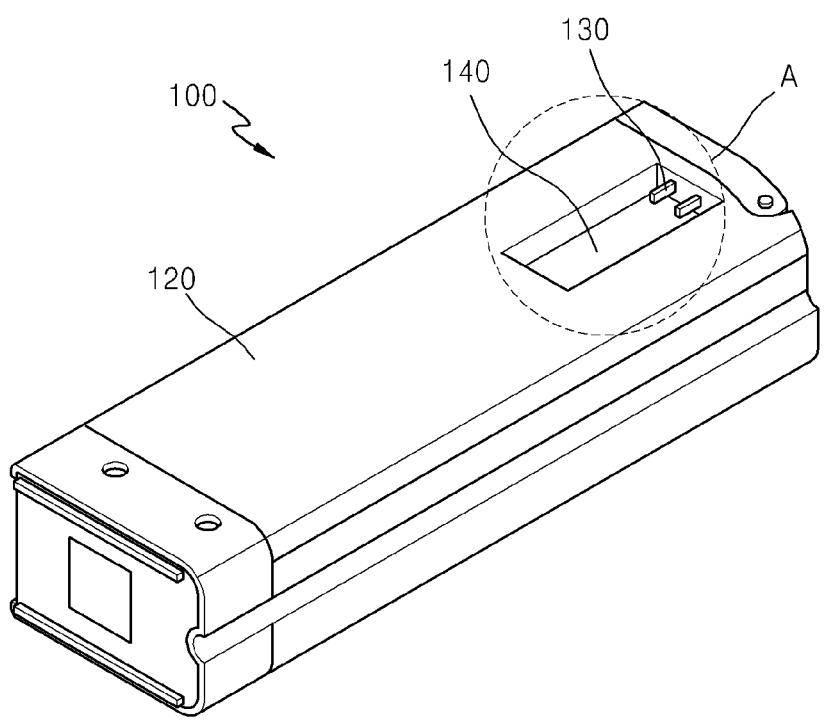
FIG. 1 is a perspective view of a secondary battery according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Figure 2:
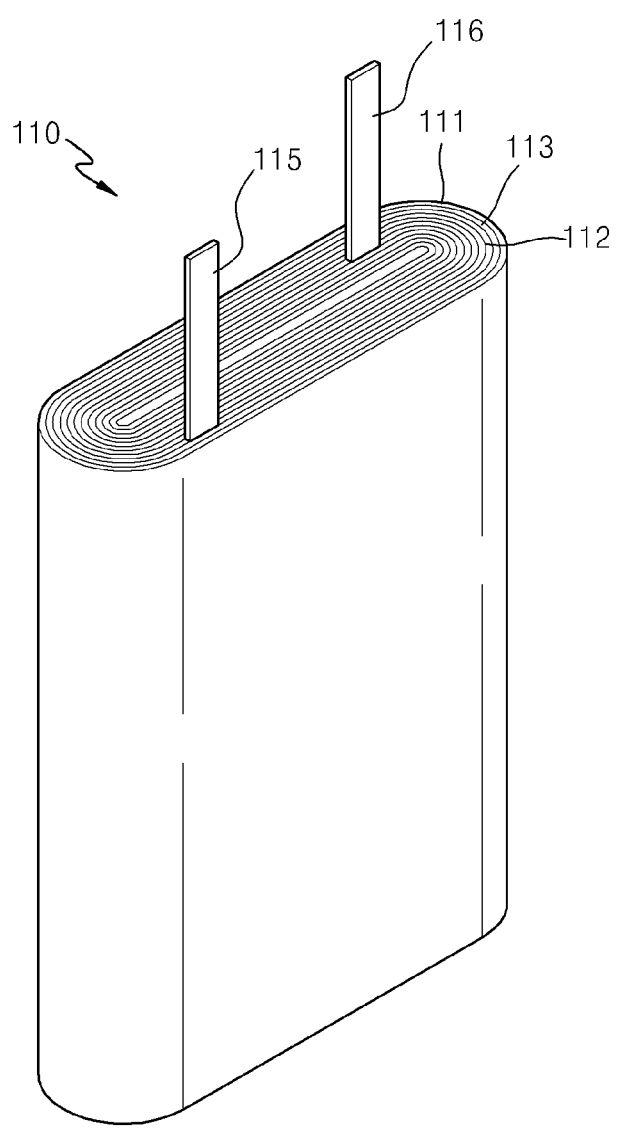
FIG. 2 is an electrode assembly which is accommodated in a case of the secondary battery of FIG. 1, according to an embodiment of the present invention.

FIG. 1 is a perspective view of a secondary battery 100 according to an embodiment of the present invention. FIG. 2 is an electrode assembly 110 accommodated in a case 120 of the secondary battery 100 of FIG. 1, according to an embodiment of the present invention. Referring to FIGS. 1 and 2, the shown secondary battery 100 includes the electrode assembly 110, the case 120 and a connection terminal 130.

While not required in all aspects of the invention, the electrode assembly 110 is formed by interposing a separator 113 between a cathode 111 and an anode 112 and winding the cathode 111, the separator 113 and the anode 112. The cathode 111 is adhered to a cathode tab 115, and the anode 112 is adhered to an anode tab 116. The electrode assembly 110 is electrically connected to the connection terminal 130. When an external load is connected to the connection terminal 130, the electrode assembly 110 is discharged. When an external power source is connected to the connection terminal 130, the electrode assembly 110 may be charged. While shown as a wound electrode assembly 110, it is understood that the assembly 110 can also be a stacked electrode assembly in which the cathode 111, the separator 113 and the anode 112 are stacked and not wound, and/or a plurality of electrode assemblies or smaller battery cells.

The case 120 accommodates the electrode assembly 110, and is sealed in such a way that the connection terminal 130 is connected to the electrode assembly 110 and is exposed out of the case 120. According to the shown embodiment, the secondary battery 100 may be a lithium-ion battery, but is not limited thereto. For example, the secondary battery 100 may be a nickel-cadmium secondary battery, a nickel-hydrogen secondary battery, or a lithium battery. Moreover, while described in the context of a secondary battery, it is understood that the battery 100 can be a primary battery.

Figure 4:
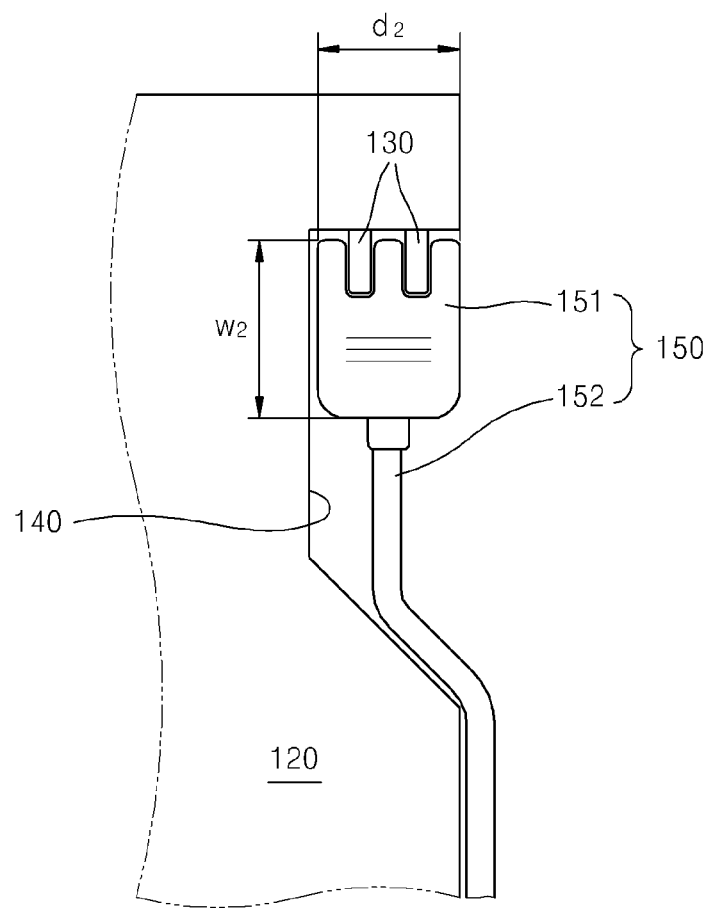
FIG. 4 is a cross-sectional view of the secondary battery of FIG. 3 when an external connection portion is connected, according to an embodiment of the present invention.

The connection terminal 130 is connected to the electrode assembly 110, and is electrically connectable to an external connection portion 150 (see FIG. 4). The connection terminal 130 may have charging and discharging functions. That is, when the connection terminal 130 is connected to an external load, electricity generated by the electrode assembly 110 may be provided to the external load. When the connection terminal 130 is connected to an external power source, the electrode assembly 110 may be charged. However, it is understood that the connection terminal 130 need not be used for both charging and discharging, such as when the assembly 110 only produces power.

A portion of the connection terminal 130 is exposed out of the case 120 and connected to the external connection portion 150. Referring to FIG. 1, the connection terminal 130 is exposed out of the case 120 via an accommodation groove 140.

Figure 3:
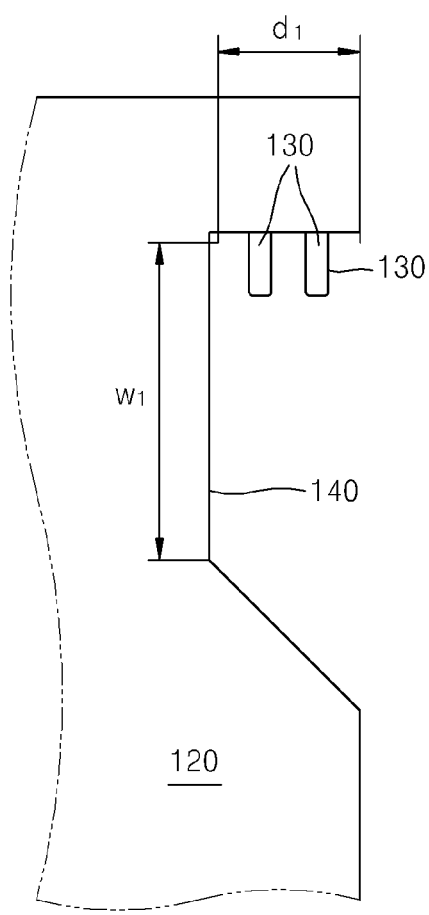
FIG. 3 is a schematic cross-sectional view of a portion 'A' of the secondary battery of FIG. 1, according to an embodiment of the present invention.

FIG. 3 is a schematic cross-sectional view of a portion 'A' of the secondary battery 100 of FIG. 1, according to an embodiment of the present invention. FIG. 4 is a cross-sectional view of the secondary battery 100 of FIG. 3 when the external connection portion 150 is connected, according to an embodiment of the present invention. Referring to FIGS. 3 and 4, the accommodation groove 140 is a portion of a surface of the case 120 that is recessed. A plug 151 of the external connection portion 150 is accommodated in the accommodation groove 140. A cable or cord 152 extends from the plug 151. As shown, the external connection portion 150 is detachably connectable to the connection terminal 130. Further, while shown as a two pronged plug 151, it is understood that the plug 151 is not limited to the number of prongs. Further, the plug 151 is shown as the female connector, it is understood that the plug 151 could be the male connector in which case the connection terminal 130 would be the female connector.

The shown accommodation groove 140 is a portion of the surface of the case 120 that is recessed so that the plug 151 of the external connection portion 150 may be connected to the connection terminal 130 without protruding out of the surface of the case 120. In addition, the accommodation groove 140 is formed sufficiently wide so that the plug 151 may be easily connected to and separated from the connection terminal 130.

That is, a depth 'd1' of the accommodation groove 140 is shown greater than a thickness 'd2' of the plug 151, and a width 'w1' of the accommodation groove 140 is shown greater than a length 42' of the plug 151. However, it is understood that the invention is not limited to the shown depths and widths. For instance, the depth d1 could be greater than the thickness d2, such as where the plug 151 is only partially disposed within the accommodation groove 140.

Figure 5:
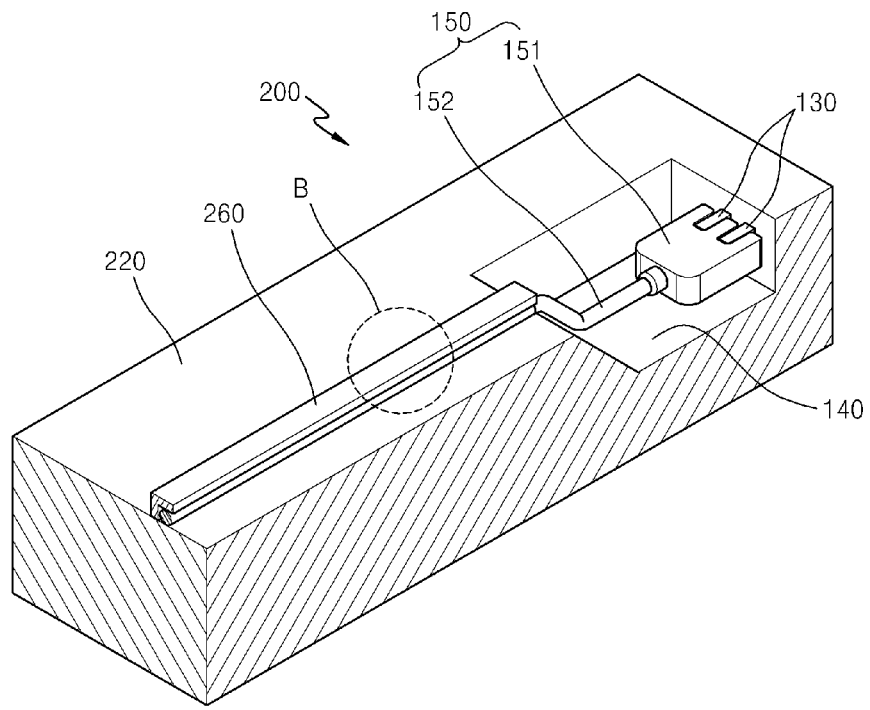
FIG. 5 is a perspective view of a secondary battery according to another embodiment of the present invention.
Figure 6:
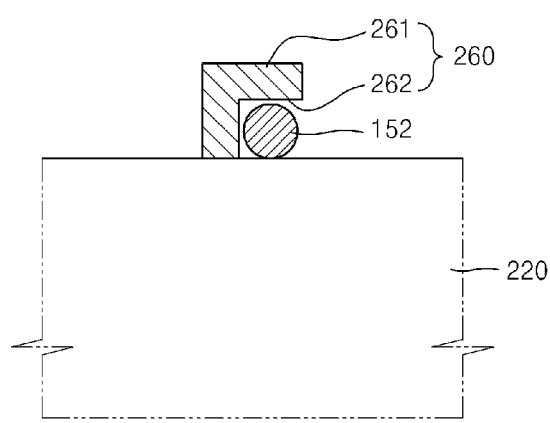
FIG. 6 is a schematic cross-sectional view of a portion 'B' of the secondary battery of FIG. 5, according to an embodiment of the present invention.

FIG. 5 is a perspective view of a secondary battery 200 according to another embodiment of the present invention. FIG. 6 is a schematic cross-sectional view of a portion 'B' of the secondary battery 200 of FIG. 5, according to an embodiment of the present invention. Referring to FIGS. 5 and 6, the secondary battery 200 further includes a cable fixing unit 260.

The external connection portion 150 includes the plug 151 and the cable 152. The plug 151 is disposed at an end of the cable 152, and may be connected directly to the connection terminal 130. The cable fixing unit 260 fixes the cable 152 to a case 220 so that the cable 152 may not be shaken. Specifically, the cable fixing unit 260 includes an extension unit 261 protruding from a surface of the case 220, and a fixation groove 262. The fixation groove 262 is recessed so as to cover the cable 152. The shown fixation groove 262 is formed to have a size greater than a diameter of the cable 152 so as to accommodate the cable 152 as shown. When the plug 151 is connected to the connection terminal 130, the cable 152 is accommodated in the fixation groove 262 so as to be fixed to the case 220, thereby preventing the plug 151 from being unexpectedly separated from the connection terminal 130. While shown as having the size greater than the diameter of the cable 152, it is understood that the size need not be greater than the diameter of the cable 152, such as where the cable 152 is only partially covered by the fixation groove 262.

Figure 7:
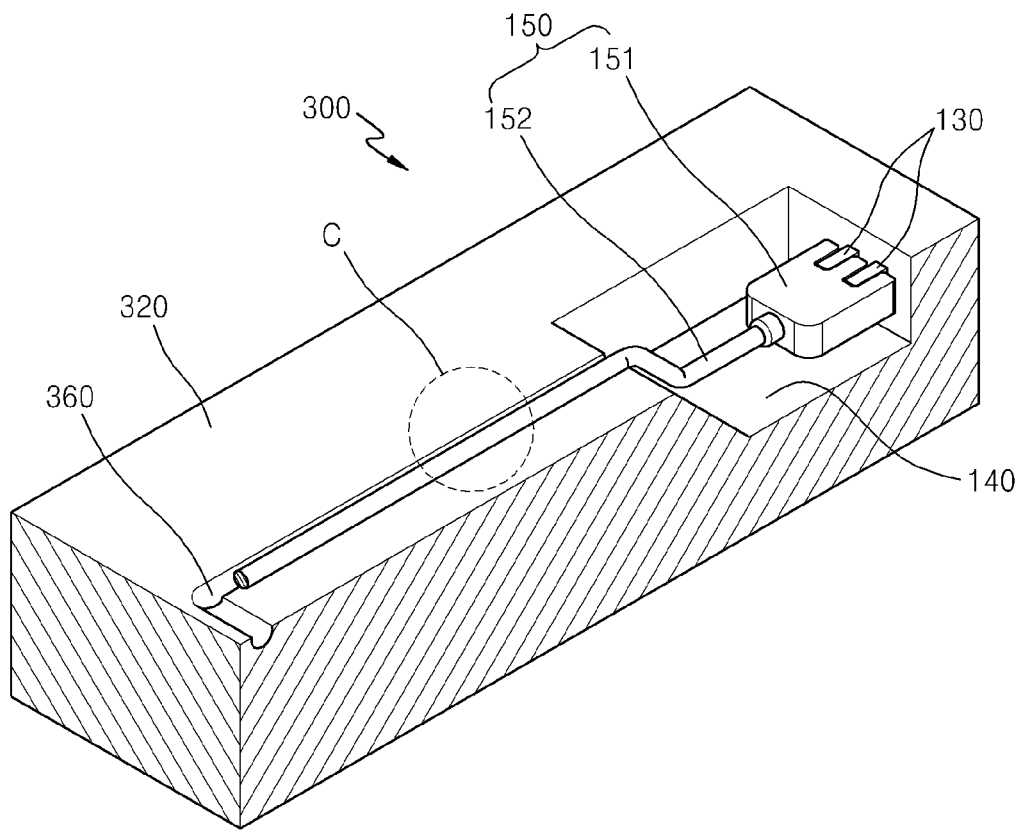
FIG. 7 is a perspective view of a secondary battery according to another embodiment of the present invention.
Figure 8:
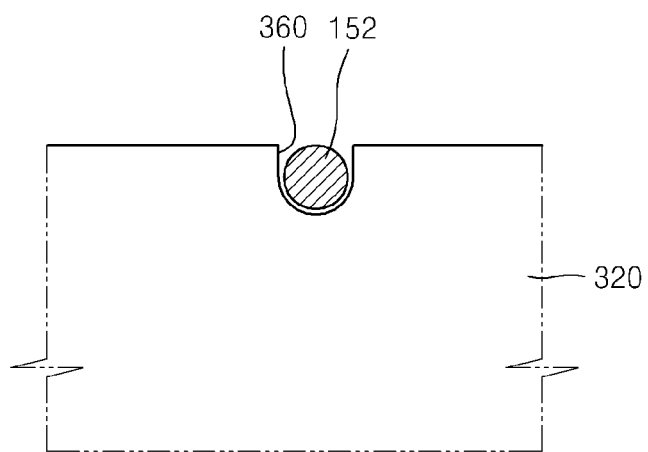
FIG. 8 is a schematic cross-sectional view of a portion 'C' of the secondary battery of FIG. 7, according to an embodiment of the present invention.

FIG. 7 is a perspective view of a secondary battery 300 according to another embodiment of the present invention. FIG. 8 is a schematic cross-sectional view of a portion 'C' of the secondary battery 300 of FIG. 7, according to an embodiment of the present invention. Referring to FIGS. 7 and 8, the secondary battery 300 includes a cable fixing unit 360. The cable fixing unit 360 is a portion of a surface of a case 320 that is recessed so as to accommodate the cable 152. While shown as different embodiments, it is understood that the fixation groove 262 of FIGS. 5 and 6 can be used in addition to the cable fixing unit 360.

The cable fixing unit 360 is shown formed to have a size greater than a diameter of the cable 152 so as to accommodate the cable 152. When the plug 151 is connected to the connection terminal 130, the cable 152 is accommodated in the cable fixing unit 360 so as to be fixed within the cable fixing unit 360, thereby preventing the plug 150 from being separated from the connection terminal 130 due to shaking of the cable 152. While shown as having the size greater than the diameter of the cable 152, it is understood that the size need not be greater than the diameter of the cable 152, such as where the cable 152 is only partially in the cable fixing unit 360.

Figure 9:
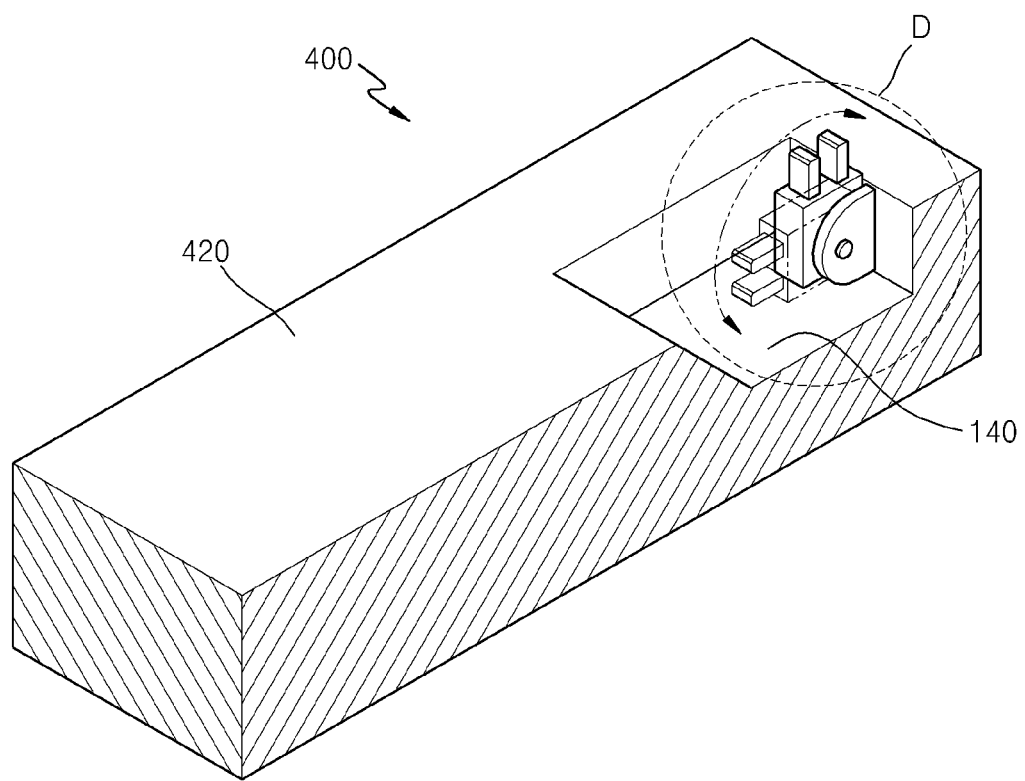
FIG. 9 is a perspective view of a secondary battery according to another embodiment of the present invention.
Figure 10:
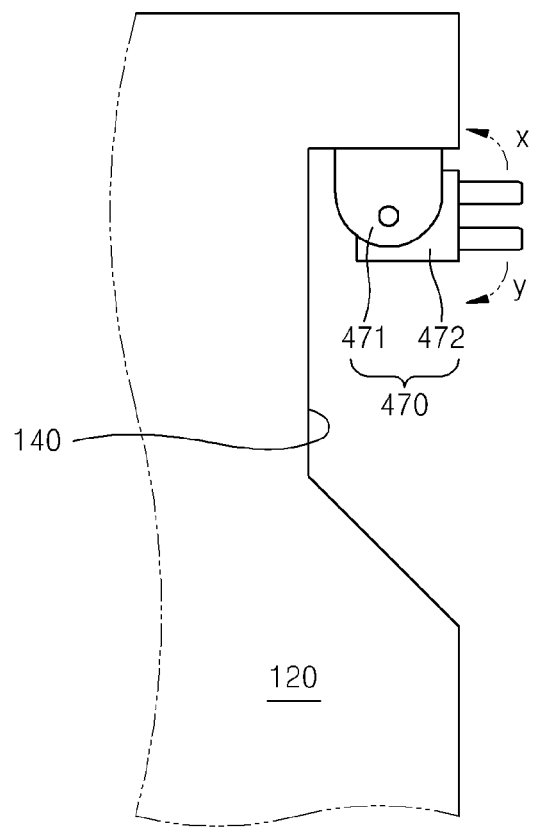
FIG. 10 is a schematic cross-sectional view of a portion 'D' of the secondary battery of FIG. 9, according to an embodiment of the present invention.

FIG. 9 is a perspective view of a secondary battery 400 according to another embodiment of the present invention. FIG. 10 is a schematic cross-sectional view of a portion 'D' of the secondary battery 400 of FIG. 9, according to an embodiment of the present invention. Referring to FIGS. 9 and 10, the secondary battery 400 includes a supporting unit 471 and a connection unit 472.

The supporting unit 471 is fixed to a surface of the accommodation groove 140. An end of the connection unit 472 is hinged to the supporting unit 471, and the other end of the connection unit 472 may be electrically connected to the plug 151 (see FIG. 4). Since the connection unit 472 is hinged to the supporting unit 471, the connection unit 472 and the plug 151 may be easily connected to or separated from each other by rotating the connection unit 472 in an 'X' direction so as to protrude out of the accommodation groove 140. In addition, after the connection unit 472 and the plug 151 are connected to or separated from each other, the connection unit 472 may be accommodated in the accommodation groove 140 by rotating the connection unit 472 in a 'y' direction.

In the secondary battery 400, since the connection unit 472 may be rotatably hinged on the supporting unit 471, the connection unit 472 may be easily connected to and separated from the plug 151.

While described in terms of an electrode assembly, it is understood that the aspects of the invention can be implemented in other portable power generators, such as fuel cells, solar cells, etc.

As described above, according to the one or more of the above embodiments of the present invention, a secondary battery may be charged and discharged via a single connection terminal, and an external connection portion may be prevented from being unexpectedly separated from a connection terminal due to external shocks.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A housing to accommodate a power generating device which is connectable to an external connection portion, the housing comprising:
    a case having an interior which houses the power generating device in the case and an exterior surface having a recessed portion sized to accommodate the external connection portion; and
    a connection terminal exposed outside of the case to form prongs of a male plug and disposed in the recessed portion, the connection terminal connectable to the power generating device when in the case and is electrically connectable to a female plug of the external connection portion, wherein the male plug forms the recessed portion and the prongs of the male plug are disposed in the recessed portion,
    wherein the case further comprises a cable fixing unit configured to fix a cord to a portion of the surface of the case, wherein the cable fixing unit comprises an extension unit which protrudes from a portion of the surface of the case, and a groove formed in the extension unit so as to accommodate the cord, wherein at least a portion of the cord is accommodated in the recessed portion of the exterior surface.

2. The housing of claim 1, wherein the external connection portion is disposed entirely within the recessed portion when connected to the connection terminal.

3. The housing of claim 1, wherein:
    the external connection portion is substantially parallel with the surface when connected to the connection terminal, and
    the external connection portion is disposed at least partially within the recessed portion when connected to the connection terminal.

4. The housing of claim 1, wherein a length of the recessed portion is at least as long as a length of the external connection portion when connected to the connection terminal.

5. The housing of claim 4, wherein a depth of the recessed portion is at least as deep as a height of the external connection portion when connected to the connection terminal.

6. The housing of claim 1, wherein:
    the external connection portion comprises the female plug and the cord extending from the female plug to an external device,
    the female plug is disposed in the recessed portion, and
    wherein the groove extends from the recessed portion and accommodates the cord while the female plug is disposed in the recessed portion.

7. The housing of claim 6, wherein the case further comprises an extended portion which forms the groove with the exterior surface.

8. The housing of claim 6, wherein the groove comprises another recessed portion in the exterior surface.

9. The housing of claim 1, wherein the connection terminal is rotatable about an axis.

10. A power generating assembly connectable to an external connection portion, the assembly comprising:
    a power generating device;
    a case having an interior which houses the power generating device in the case and an exterior surface having a recessed portion sized to accommodate the external connection portion; and
    a connection terminal exposed outside of the case to form prongs of a male plug and disposed in the recessed portion, the connection terminal connected to a female plug of the power generating device and is electrically connectable to the external connection portion, wherein the male plug forms the recessed portion and the prongs of the male plug are disposed in the recessed portion,
    wherein the case further comprises a cable fixing unit configured to fix a cord to a portion of the surface of the case, an extension unit which protrudes from a portion of the surface of the case, and a groove formed in the extension unit so as to accommodate the cord, wherein at least a portion of the cord is accommodated in the recessed portion of the exterior surface.

11. The power generating assembly of claim 10, wherein the external connection portion is disposed entirely within the recessed portion when connected to the connection terminal.

12. The power generating assembly of claim 10, wherein:
    the external connection portion is substantially parallel with the surface when connected to the connection terminal, and
    the external connection portion is disposed at least partially within the recessed portion when connected to the connection terminal.

13. The power generating assembly of claim 10, wherein a length of the recessed portion is at least as long as a length of the external connection portion when connected to the connection terminal.

14. The power generating assembly of claim 13, wherein a depth of the recessed portion is at least as deep as a height of the external connection portion when connected to the connection terminal.

15. The power generating assembly of claim 10, wherein:
    the external connection portion comprises the female plug and the cord extending from the female plug to an external device,
    the female plug is disposed in the recessed portion, and
    wherein the groove extends from the recessed portion and accommodates the cord while the female plug is disposed in the recessed portion.

16. The power generating assembly of claim 15, wherein the case further comprises an extended portion which forms the groove with the exterior surface.

17. The power generating assembly of claim 15, wherein the groove comprises another recessed portion in the exterior surface.

18. The power generating assembly of claim 10, wherein the connection terminal is rotatable about an axis.

* * * * *